United States Patent [19]

Coetzer

[11] Patent Number: 4,975,343
[45] Date of Patent: Dec. 4, 1990

[54] ELECTROCHEMICAL CELL

[75] Inventor: Johan Coetzer, Pretoria, South Africa

[73] Assignee: Lilliwyte Societe Anonyme, Luxembourg, Luxembourg

[21] Appl. No.: 357,519

[22] Filed: May 24, 1989

[30] Foreign Application Priority Data

May 27, 1988 [GB] United Kingdom ............... 8812586

[51] Int. Cl.[5] .......................................... H01M 10/39
[52] U.S. Cl. .................................... 429/103; 29/623.1
[58] Field of Search ............... 429/103, 104; 29/623.1

[56] References Cited

U.S. PATENT DOCUMENTS

| | | | |
|---|---|---|---|
| 3,877,984 | 4/1975 | Werth | 429/103 |
| 4,069,371 | 1/1978 | Voinov | 429/104 |
| 4,287,271 | 9/1981 | Coetzer et al. | 429/103 |
| 4,529,676 | 7/1985 | Galloway et al. | 429/103 |
| 4,546,055 | 10/1985 | Coetzer et al. | 429/103 |
| 4,560,627 | 12/1985 | Bones et al. | 429/103 |
| 4,585,712 | 4/1986 | Wedlake | 429/50 |
| 4,592,969 | 6/1986 | Coetzer et al. | 429/50 |
| 4,626,483 | 12/1986 | Bones et al. | 429/50 |
| 4,722,875 | 2/1988 | Wright | 429/103 |
| 4,772,293 | 9/1988 | Bugden et al. | 29/623.1 |
| 4,772,449 | 9/1988 | Bones et al. | 419/2 |
| 4,774,156 | 9/1988 | Bones et al. | 429/103 |
| 4,797,333 | 1/1989 | Coetzer et al. | 429/103 |

FOREIGN PATENT DOCUMENTS 2134698B 6/1986 United Kingdom .
2189951A 11/1987 United Kingdom .
193226A 2/1988 United Kingdom .

Primary Examiner—Stephen J. Kalafut
Attorney, Agent, or Firm—Arnold, White & Durkee

[57] ABSTRACT

An electrochemical cell has a molten alkali metal anode separated by a separator which is a conductor of anode ions from an alkali metal aluminium halide molten electrolyte which couples the anode to a cathode having an active material comprising Fe, Ni, Co, Cr and/or Mn. The molten electrolyte is doped by a dopant $M_2X$, $MY$ or $M_4Z$ in which M is the anode metal, X, Y and Z are respectively anions which are divalent, monovalent and polyvalent. The dopant acts to reduce the Lewis acidity of the molten electrolyte.

10 Claims, 11 Drawing Sheets

ELECTROCHEMICAL CELL

This invention relates to a high temperature rechargeable electrochemical power storage cell; to a molten salt electrolyte for such cell; and to a method of operation of such cell.

According to one aspect of the invention there is provided a high temperature rechargeable electrochemical power storage cell which comprises:

an alkali metal anode which is molten at the operating temperature of the cell;

an alkali metal aluminium halide molten salt electrolyte whose alkali metal is the same as that of the anode, whose halide ions include chloride ions and which is molten at the operating temperature of the cell;

a cathode whose active cathode material comprises at least one member of the group of transition metals consisting of Fe, Ni, Co, Cr and Mn and which is in contact with said electrolyte; and between the anode and electrolyte and separating them from each other, a separator which is a solid conductor of ions of the alkali metal of the anode, the electrolyte containing a dopant which is a member of the group comprising $M_2X$, $MY$ and $M_AZ$ in which M is the alkali metal of the anode, X is a divalent anion, Y is a monovalent anion and Z is a polyvalent anion with a valency of A, said dopant acting to reduce the Lewis acidity of the electrolyte.

Thus, the dopant can react with the $MAlCl_4$ in accordance with any one of reactions (I)–(IV) as follows:

(I)

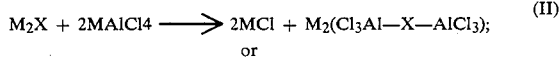
(II)

or

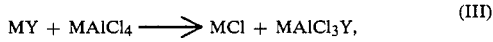
(III)

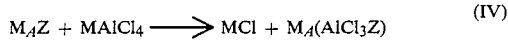
(IV)

the products $MAlCl_2X$, $M_2(Cl_3Al-X-AlCl_3)$ and $MAlCl_3Y$ having a lower Lewis acidity than $MAlCl_4$, and the doped molten salt electrolyte containing M and Al in a M:Al molar ratio of at least 1:1.

The alkali metal M of the anode and of the molten salt electrolyte may be Na, the separator being a β-alumina solid conductor of sodium ions. It will be appreciated, however, that although the separator will typically be a β-alumina (e.g. β''-alumina) or nasicon solid conductor of sodium ions, the invention can apply equally to cation-exchanged β-aluminas such as potassium- or lithium-β-aluminas, which are conductors of potassium or lithium ions respectively.

In the cell of the present invention, the active cathode material is conveniently dispersed in an electrolyte-permeable, electronically conductive matrix, which has the molten salt electrolyte impregnated therein. This matrix may be formed of the transition metal of the cathode in metallic form, or it may be an intermediate refractory hard metal compound of the transition metal with a non-metal such as carbon, silicon, nitrogen, boron or phosphorous.

In the case where M is Na, reactions (I) to (IV) set forth above can be represented as follows:

(V) $Na_2X + NaAlCl_4 \rightarrow 2NaCl + NaAlCl_2X$;
(VI) $Na_2X + 2NaAlCl_4 \rightarrow 2NaCl + Na_2(Cl_3Al-X-AlCl_3)$;
(VII) $NaY + NaAlCl_4 \rightarrow NaCl + NaAlCl_3Y$; and
(VIII) $Na_AZ + NaAlCl_4 \rightarrow NaCl + Na_A(AlCl_3Z)$ In the case of reactions (II) and (VI) set forth above, the reaction product containing Al and X has an anion which is a polymer, whose basic structure is as follows:

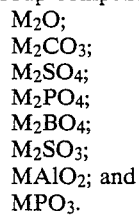

However, longer polymers of the form $-Al-X-Al-X-Al-$... are also possible, and similar polymers can occur with regard to reaction products of reactions (IV) and (VIII).

The dopant may comprise at least one member of the group comprising:

$M_2O$;
$M_2CO_3$;
$M_2SO_4$;
$M_2PO_4$;
$M_2BO_4$;
$M_2SO_3$;
$MAlO_2$; and
$MPO_3$.

As indicated above, M will typically be Na, so that examples of species falling within the definition of $M_2X$ are $Na_2O$, $Na_2CO_3$, $Na_2SO_4$, $Na_2PO_4$, $Na_2BO_4$ and $Na_2SO_3$; and examples of MY are $NaAlO_2$ and $NaPO_3$. Sodium oxalate $(COONa)_2$, borax $(Na_2B_4O_{10})$ and $Na_4P_2O_7$ can also be used. The aforegoing are merely the preferred anion species, and it will be appreciated that other anions which contain atoms or groups which are less electronegative than $Cl^-$ and which are capable of displacing $Cl^-$ form an $AlCl_3$ molecule can be used instead. Where M is Na, the Applicant has found that, conveniently, the only halide ions in the molten salt electrolyte are chloride ions, the dopant being $Na_2CO_3$.

As indicated above, $MAlCl_2X$; $M_2(Cl_3Al-X-AlCl_3)$ or polymers thereof; $MAlCl_3Y$; or $M_A(AlCl_3Z)$ or polymers thereof must have a lower Lewis acidity than $MAlCl_4$. In other words, $AlClX$; or $(Cl_2Al-X-AlCl_2)$ or polymers thereof; $(AlCl_3Z)$ or polymers thereof; or $AlCl_2Y$ should each be a weaker Lewis acid than $AlCl_3$.

The dopant may be present in the molten salt electrolyte in a proportion of from 2-30 mole %, preferably from 5-10 mole %.

The invention provides further a molten salt electrolyte for a high temperature rechargeable electrochemical power storage cell containing a dopant which is a member of the group $M_2X$, $MY$ and $M_AZ$ as herein described.

The invention extends also to a method of combatting progressive rise in internal resistance of a cell as herein described, partlicularly on overcharging, which method comprises doping the liquid electrolyte of the cell with a dopant which is a member of the group $M_2X$, $MY$ and $M_AZ$ as herein described.

In the specific case indicated above where the molten salt electrolyte of the cell comprises essentially doped sodium aluminium chloride, in which the only halide ions are chloride ions, this electrolyte, in the absence of the dopant can be represented as stochiometrically exact $NaAlCl_4$, in which the ratio of Na:Al ions on a molar basis is 1:1. This undoped electrolyte can be regarded as a mixture of an AlCl₃ Lewis acid and an NaCl base. The beta-alumina of the separator used therewith can in turn be regarded as comprising an Al₂O₃ Lewis acid and an Na₂O Lewis base, which together form the compound Na₂O.11Al₂O₃. Accordingly, the NaAlCl₄ undoped electrolyte and the beta-alumina can react together in accordance with reaction (IX)

$$Na_2O.11Al_2O_3 + NaAlCl_4 \rightarrow 2NaCl + 11Al_2O_3 + NaAlCl_2O \quad (IX)$$

whereby the beta-alumina can become depleted of Na₂O, which is the sodium ion-conducting component thereof, as the NaAlCl₄ electrolyte is more Lewis acidic than said Na₂O.11Al₂O₃. This is more likely to occur when the AlCl₃:NaCl mole ratio > 1.

Similar depletion can take place in analogous systems employing potassium- or lithium-beta-aluminas and molten salt electrolytes where the alkali metal is potassium or lithium, as the case may be.

It follows that incorporation into a molten salt electrolyte of any dopant $M_2X$, $MY$ or $M_4Z$ as defined above, which tends to reduce the Lewis acidity of the molten salt electrolyte, will tend to reduce the likelihood that reactions such as reaction (IX) will take place. Put differently, if an MAlCl₄ electrolyte is regarded as comprising M⁺ cations and AlCl₄⁻ anions, which anions exist in equilibrium with Cl⁻ anions and AlCl₃ Lewis acid molecules in terms of the equilibrium reaction (X);

$$AlCl_4^- \rightarrow Cl^- + AlCl_3,$$

then any dopant which drives this equilibrium to the left and reduces the concentration of free AlCl₃ in the electrolyte, is desirable.

From reactions (I), (II), (III) or (IV) above, adding the dopant $M_2X$, $MY$ or $M_4Z$ to MAlCl₄ will produce $MAlCl_2X$; or $M_2(Cl_3Al-X-AlCl_3)$ or polymers thereof; $MAlCl_3Y$; or $M_4(AlCl_3Z)$ or polymers thereof, the anions of which respectively are $(AlCl_2X)^-$, $(Cl_3Al-X-AlCl_3)^=$ or like polymeric anions; $(AlCl_3Y)^-$; or $(AlCl_3Z)^{n-}$ or like polymeric anions, which exist in equilibrium together with Cl⁻ anions and Lewis acid molecules such as AlClX; or $(Cl_2Al-X-AlCl_2)$ or polymers thereof; $AlCl_2Y$; or $AlCl_2Z$ or polymers thereof as the case may be. The Lewis acid produced must thus be a weaker acid than AlC₃.

For example, in the case of Na₂O as dopant, AlClX is AlClO; in the case of Na₂PO₄ as dopant, AlClX is AlClPO₄; and in the case of Na₂BO₄ as dopant, AlClX is AlClBO₄. AlClO, AlClPO₄ and AlClBO₄ are all weaker Lewis acids than AlCl₃, and adding such dopants thus reduces the overall AlCl₃ concentration, and reduces the overall Lewis acidity of the molten electrolyte. This results in a reduced tendency for reactions such as reaction (IX) above to take place, and consequently results in a reduced rate and/or degree of Na₂O depletion of the beta-alumina separator, which depletion ca be regarded as a form of poisoning of the separator.

Naturally the dopant added, i.e. its nature and the proportions thereof used, should not have any undesirable effects on the cell. Thus it should not interfere with the basic electrochemical cell reaction and should not elevate the melting point of the molten electrolyte unacceptably. In choosing the dopant, it should be borne in mind that steric factors may play a part, and use of a dopant having a bulky anion (bulkier than Cl⁻) can also contribute beneficially by resisting any tendency for $MAlCl_2X$; or $M_2(Cl_3Al-X-AlCl_3)$ or polymers thereof; or $MAlCl_3Y$; or $M_4(AlCl_3Z)$ or polymers thereof to react with $M_2O.11Al_2O_3$ at the separator surface in a fashion analogous to reaction (IX).

Finally, it should be noted that with certain active cathode materials in accordance with the present invention such as Fe/FeCl₂, certain of the transition metal chlorides such as FeCl₂ can, it is believed, be inactivated in an electrochemical sense (i.e. unavailable for electrochemical use) at elevated temperatures eg 300° C. or more. This may arise from their reacting with substances such as MCl or AlCl₃ present in the molten electrolyte, to form electrochemically inactive products (polymers or like inactive phases). It follows that any dopant which will tend to reduce the concentration of AlCl₃ in the molten electrolyte (in favour of AlCl₄⁻) will be beneficial also from this point of view.

The invention will now be described, with reference to the following non-limiting Examples and schematic drawings in which.

EXAMPLE 1 - Making Doped Electrolyte 1,252 kg of AlCl₃ in finely divided powder form was thoroughly mixed with 0,548 kg of NaCl. This mixture was heated in a nickel pot at a temperature held between 250° and 300° C. for about 18 hours to form a molten undoped sodium chloroaluminate electrolyte in which there is a 1:1 molar ratio of NaCl to AlCl₃. Na₂CO₃ dopant was then admixed into the undoped electrolyte (30 g of Na₂CO₃ for each kg of AlCl₃ used). The partially doped electrolyte was then left to react to equilibrium for about 2 hrs at 250°-300° C., and aluminium metal powder (about 5 g for each kg of AlCl₃ used) was then admixed into the melt to remove any residual acidic hydrogen which may have been present in the AlCl₃ starting material and the fully doped electrolyte left for about 1 hr at 250°-300° C. to reach equilibrium.

In this way a doped molten salt electrolyte (sodium chloroaluminate doped with Na₂CO₃) was made, suitable for use in cells of the type hereinabove described having beta-alumina separators and cathodes (charged) in the form of FeCl₂, NiCl₂, CoCl₂, CrCl₂, MnCl₂ or mixtures of two of more of these transition metal chlorides. The new electrolyte has, arising from the proportions of the AlCl₃, NaCl, Na₂CO₃ and aluminium metal used, a Na:Al molar ratio in the molten salt solution formed of 1:1; and this requirement can easily be ensured by providing a slight excess of the NaCl starting material. By virtue of the use of the Na₂CO₃, the doped electrolyte has a lower Lewis-acidity than a 1:1 molar NaCl:AlCl₃ melt (i.e. NaAlCl₄).

Figure 1:
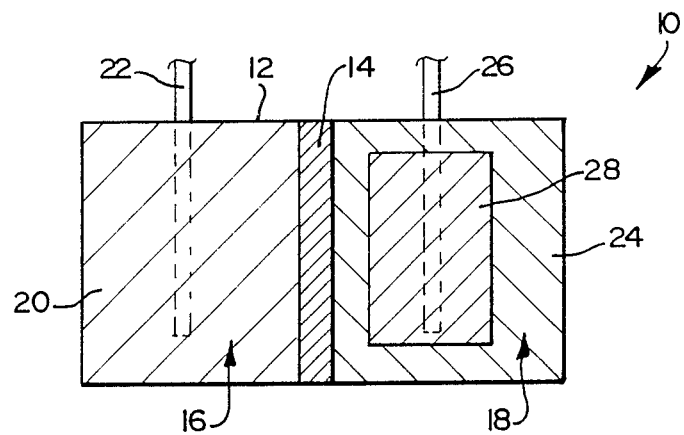
FIG. 1 shows a diagrammatic sectional side elevation of an electrochemical cell in accordance with the present invention.

This molten salt electrolyte can then be used in a cell of the type shown in FIG. 1.

In FIG. 1 of the drawings, reference numeral 10 generally designates a high temperature rechargeable electrochemical cell according to the invention. The cell comprises a housing 12 divided by a beta-alumina separator 14 into an anode compartment 16 and a cathode compartment 18. The anode compartment contains molten sodium active anode material 20 and is provided with a terminal post/current collector 22. The cathode compartment in turn contains the abovedescribed sodium chloroaluminate molten salt electrolyte doped with $Na_2CO_3$ at 24, and is provided with a terminal post/current collector 26. A cathode 28 is provided in the cathode compartment and comprises an electronically conductive electrolyte-permeable porous matrix saturated with said electrolyte 24, within which the post 26 is embedded. In its charged state the cathode 28 contains, dispersed therein and in contact with the matrix and with the electrolyte 24, one or more of the abovementioned transition metal chlorides, eg $NiCl_2$ or $FeCl_2$, as active cathode material.

Upon discharging of the cell, sodium passes from the anode 20 through the separator 14 and electrolyte 24 in the ionic form to the cathode, where the $FeCl_2$ is discharged to iron with the production of NaCl. Upon subsequent charging the reverse takes place, with $FeCl_2$ being produced at the cathode, while iron is consumed at the cathode and ionic sodium passes back through the electrolyte 24 and separator 14 to the anode, where it receives electrons to form molten sodium.

It will thus be appreciated that, if there is a 1:1 molar ratio of Na:Al in the electrolyte in the fully charged state of the cell, this ratio will be maintained during discharging because discharging of the cell leads to production of NaCl in solid form in contact with the electrolyte 24, so that said ratio can never be reduced to a value less than 1:1 and the electrolyte will never become acidic. Nevertheless, as a safety precaution, a small proportion of excess NaCl may be provided in the cathode in the fully charged state of the cell, dispersed in finely divided form in the cathode matrix, to guard against acidity in the electrolyte 24.

EXAMPLE 2 - Electrolyte Test

Various electrolytes were made in accordance with the invention. In each case the dopant was employed in a concentration of 3% by mass. The dopants tested were as follows:

sodium carbonate;
sodium oxalate [$(COONa)_2$—an oxide donor];
sodium pyrophosphate ($Na_4P_2O_7$—a so-called Lux-Flood acid); and
borax ($Na_2B_4O_{10}$—the conjugate base of a so-called Lux-Flood acid).

It is to be emphasized that no attempt was made to optimize the concentration of dopant in the doped electrolytes and routine experimentation will be required to determine the best concentration of dopant for a particular cell, and indeed the best dopant for use in a particular cell.

Figure 2:
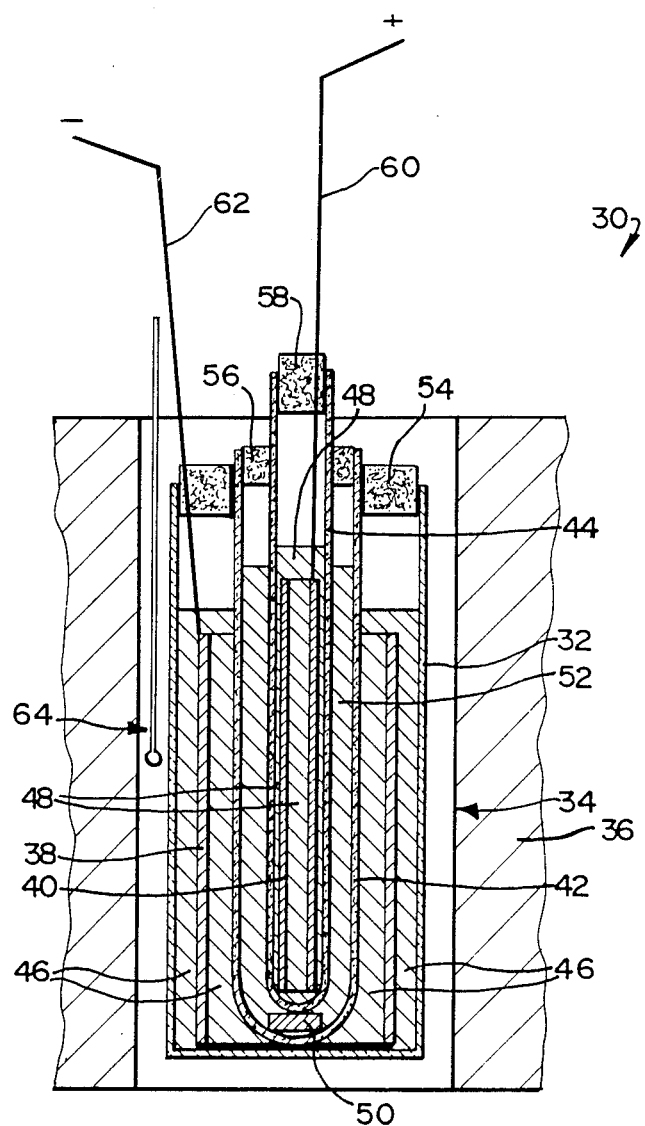
FIG. 2 shows a diagrammatic sectional side elevation of a test cell used to test molten salt electrolytes in accordance with the present invention.

With reference to FIG. 2, the test cell used is designated 30 and had a cylindrical housing in the form of a glass beaker 32 shown located in an upright condition in a passage 34 in a furnace 36. A hollow cylindrical source/sink 38 for sodium cations is shown resting concentrically on the floor of the beaker 32. The composition of this source/sink 38 will be described hereunder. A further source/sink 40 is arranged concentrically within the source/sink 38.

Two $\beta''$-alumina tubes are shown mounted inside the source/sink 38, namely an outer $\beta''$-alumina tube 42, located concentrically in the source/sink 38 and resting on the floor of the beaker 32, and an inner $\beta''$-alumina tube 44 located concentrically within the tube 42. The source/sink 40 is also in the form of a hollow cylinder and has the same composition, depending on its state of charge as emerges hereunder, as the source/sink 38. The source sink 40 is located in the tube 44 resting on the bottom thereof and spaced radially inwardly from the cylindrical wall of the tube 44. Molten salt electrolyte 46 is shown occupying the interior of the beaker 32, to a depth sufficient to immerse the source/sink 38 therein. The tube 44 similarly contains molten salt electrolyte 48 sufficient to immerse the source/sink 40. The lower end of the tube 44 is supported above the bottom of the tube 42 by an electronically insulating alumina spacer 50, and the tube 42 contains molten salt electrolyte 52, which surrounds the lower part of the tube 44. The level of the electrolyte 48 is above the level of the electrolyte 52, which is in turn above the level of the electrolyte 46.

The top of the beaker 32 is closed by an annular Kaowool ceramic wool plug 54 which surrounds the top of the tube 42. The top of the tube 42 is in turn closed by an annular Kaowool plug 56 which surrounds the tube 44. Finally, the top of the tube 44 is closed by a Kaowool plug 58.

Cell terminals 60 and 62 respectively extend through the plug 58 into contact with the source/sink 40 and through the plug 54 into contact with the source/sink 38. A temperature-monitoring thermocouple is shown at 64, in the passage 34 outside the beaker 32. The cell 30 was assembled, loaded and operated in a glove box [not shown] under a dry nitrogen atmosphere.

The source/sinks 38 and 40 were formed in similar fashion from porous sintered nickel cylinders. These cylinders were impregnated with NaCl by dipping into saturated aqueous NaCl solutions and dried. The nickel of the source/sink 38 was then chlorinated electrochemically according to the reaction:

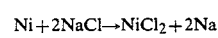
$$Ni + 2NaCl \rightarrow NiCl_2 + 2Na$$

by using it as a cathode in an electrochemical cell in which it was saturated with and immersed by a neutral $NaAlCl_4$(equimolar NaCl and $AlCl_3$) molten salt electrolyte, the electrolyte being separated by a $\beta''$-alumina separator from a mixture of nickel powder and $NiCl_2$ which was saturated with said molten salt electrolyte. This mixture formed a sodium ion sink and upon chlorinating the source/sink 38 the sodium produced by the above reaction passed in ionic form from the source/sink 38 which acted as a source, and into said mixture of nickel powder and $NiCl_2$, which acted as a sink for said ions. In this sink the sodium ions reacted with the $NiCl_2$ powder according to the reaction:

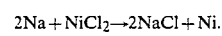
$$2Na + NiCl_2 \rightarrow 2NaCl + Ni.$$

The chlorination was effected by applying a potential across the cell, whereby electrons were supplied by an external circuit to the powder mixture by a nickel current collector and were withdrawn from the source/sink 38. The source/sink 38 was provided with 5 Ah charge in this fashion.

The charged source/sink 38 was then placed in the cell 30 of FIG. 2 as shown, where it was saturated with the electrolyte 46. The source/sink 40, impregnated with dried NaCl but unchlorinated was placed directly into the tube 44 of the cell 30 as shown, where it was saturated with the electrolyte 48. Both the electrolyte 46 and the electrolyte 48 were neutral $NaAlCl_4$ electrolytes, being equimolar mixes of NaCl and $AlCl_3$ and sufficient excess solid NaCl was added to each of them to ensure that they remained neutral at all times when the cell was used as described hereunder.

The test cell 30 was then conditioned or run-in using a neutral equimolar $NaAlCl_4$ molten salt as the electrolyte 52, by applying a potential across the terminals 60 and 62 so as to reduce the NaCl in the source/sink 38 and chlorinate the nickel in the source/sink 40. This potential was then reversed to reverse the reactions and the cell was subjected to sufficient such cyclic potential reversals and current sweeps until the source/sinks 38 and 40 operated reversibly and consistently with about 2 Ah of capacity, available reproducibly without any polarization.

When the molten salt electrolytes were made up, the base (undoped) electrolyte in each case was sodium chloroaluminate, a neutral (50:50 mole ratio of NaCl:$AlCl_3$) electrolyte being tested together with several acidic base electrolytes with varying NaCl:$AlCl_3$ mole ratios in which the molar concentration of $AlCl_3$ was greater than that of the NaCl.

These electrolytes were tested as the electrolyte 52 in cell 30, the neutral electrolytes 46 and 48 described above being retained throughout the tests.

Figure 7:
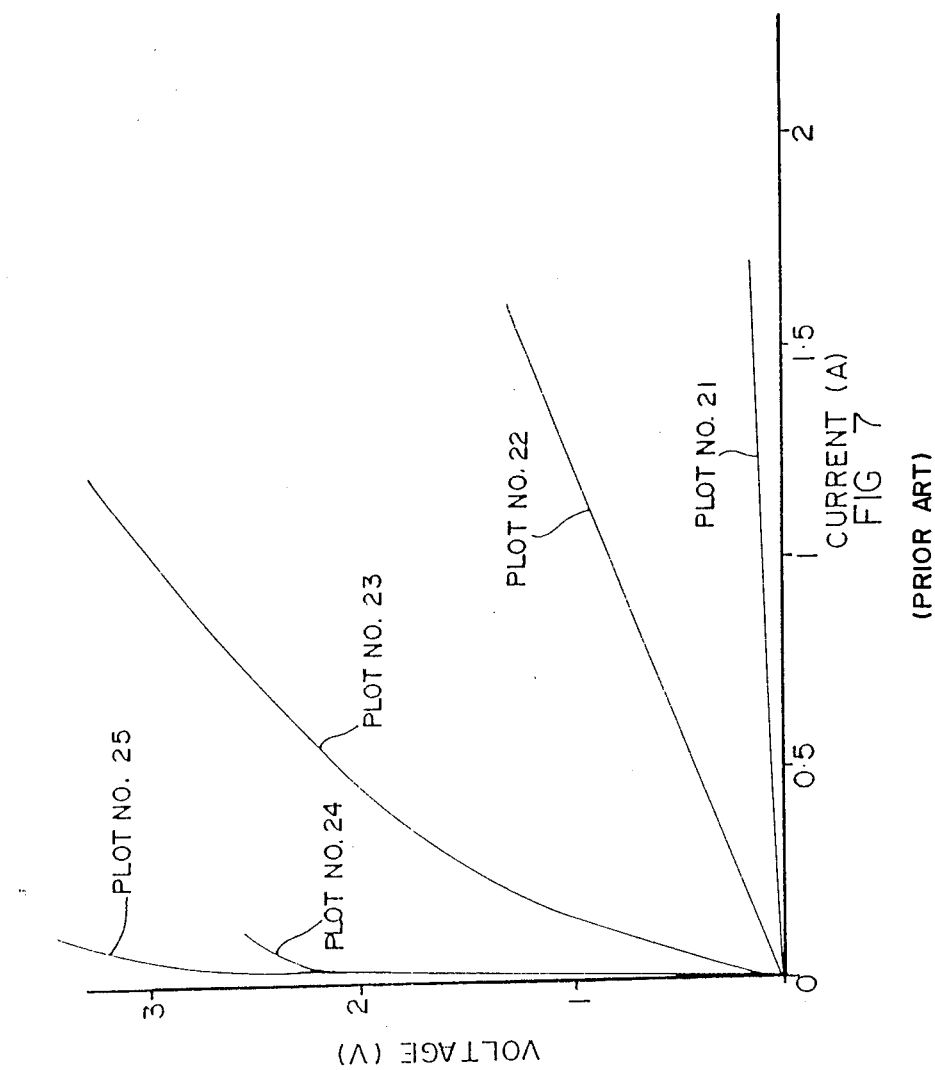
FIG. 7 shows a plot similar to FIGS. 3-6 for a prior art (control) molten salt electrolyte.

Initially, when the cell 30 was being conditioned with a neutral melt 52, it had a very low internal resistance, as in fact shown by plot 21 in FIG. 7 as described hereunder. It showed the same internal resistance regardless of the direction in which current was passed through the cell, the relationship between the voltage and current being substantially linear (ohmic behaviour) and, although there was a slight increase of resistance with time, it was negligible compared with the results given hereunder for acidic electrolytes 52. The internal resistance was in fact consistant with what was to be expected from the resistances of the neutral melts 46, 48 and 52 and of the $\beta''$-alumina tubes 42 and 44.

In each case the doped electrolytes according to the invention were made by adding the dopant to a small amount of the solidified melt and mixing it into the melt with a mortar and pestle in the glove box. This mixture was then added to the rest of the electrolyte which had previously been loaded between the tubes 42 and 44. To obtain the various acid melts appropriate small aliquots of molten $AlCl_3$ was added as powder to the neutral doped melt 52 between the tubes 42 and 44.

It should be noted that a fresh set of tubes 42, 44 was used for each dopant. Varying mole ratios of NaCl:$AlCl_3$ were used, i.e. 50:50; 49:51, 48:52; 47:53 and 43:57. Not all ratios were tested for each dopant. Initially the 50:50 melt was tested for each dopant both immediately and, in certain cases as specified hereunder, after specific intervals. Sufficient $AlCl_3$ was then added to provide the 49:51 melt and this was tested immediately and after one or more intervals as described. Then further $AlCl_3$ was added to give the next ratio i.e. 48:52 which was tested in similar fashion, and so on, progressively increasing the proportion of $AlCl_3$ up to the 43:57 ratio, using the same two tubes 42, 44 throughout the tests on the particular dopant in question.

Sodium Carbonate Dopant

For this dopant various electrolyte formulations were tested, as set out in Table 1 hereunder.

TABLE 1

| Formulation No | Mole % of NaCl and $AlCl_3$ in Base Electrolyte | | Mass Concentration of Dopant Add (% m/m) |
|---|---|---|---|
| | NaCl (mole %) | $AlCl_3$ (mole %) | |
| 1 | 50 | 50 | 3 |
| 2 | 43 | 57 | 3 |
| 3 | 47 | 53 | 3 |
| 4 | 48 | 52 | 3 |
| 5 | 49 | 51 | 3 |
| 6 | 49 | 51 | Nil (Control) |

Figure 3:
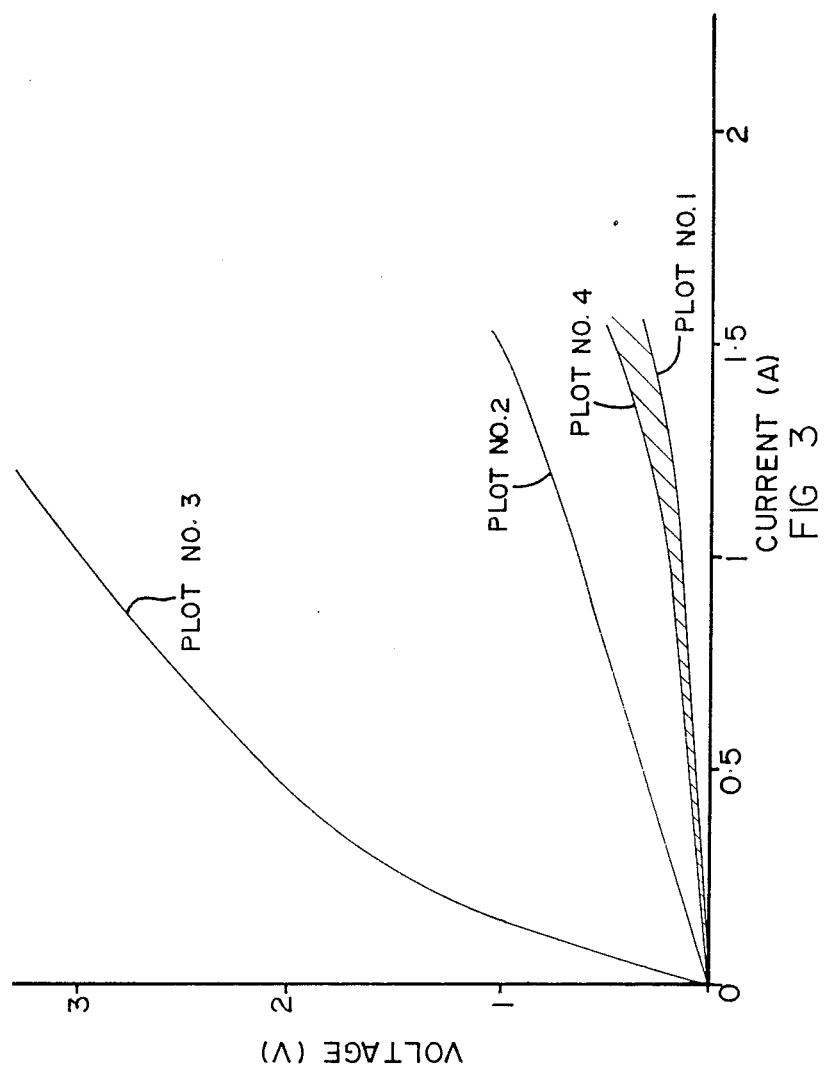
FIGS. 3-6 show plots of voltage (V) against current (A) in the test cell of FIG. 2 for various molten salt electrolytes in accordance with the invention.

In tests in the cell 30 (FIG. 2) the same amount of electrolyte was used in each case, and the voltage across the terminals 62, 64 was increased stepwise by small amounts, the current passing through the cell being measured in each case and the results being plotted in FIG. 3. The cell was tested at 300° C., both immediately this temperature was reached and at various intervals after heating to 300° C.

In FIG. 3, Plot No 1 is for Formulation No 1 tested immediately after heating of the cell to 320° C.; Plot No 2 is for Formulation No 2 after 20 hours at 300° C.; and Plot No 3 is for Formulation No 6 20 hours after heating to 300° C. Formulation No 3 was tested 120 hours after heating to 300° C.; Formulation No 4 was tested 20 hours after heating to 300° C., as was Formulation No 5; and Formulation No 2 was tested immediately after heating, these four tests all providing closely spaced plots between Plot No 1 and Plot No 4, i.e. in the shaded zone in FIG. 3.

Sodium Oxalate Dopant

The tests described above for sodium carbonate dopant were repeated for sodium oxalate dopant, for the electrolyte formulations set out in Table 2 hereunder:

TABLE 2

| Formulation No | Mole % of NaCl and $AlCl_3$ in Base Electrolyte | | Mass Concentration of Dopant Add (% m/m) |
|---|---|---|---|
| | NaCl (mole %) | $AlCl_3$ (mole %) | |
| 7 | 50 | 50 | 3 |
| 8 | 43 | 57 | 3 |
| 9 | 47 | 53 | 3 |
| 10 | 48 | 52 | 3 |
| 11 | 49 | 51 | 3 |
| 12 | 49 | 51 | Nil (Control) |

Figure 4:
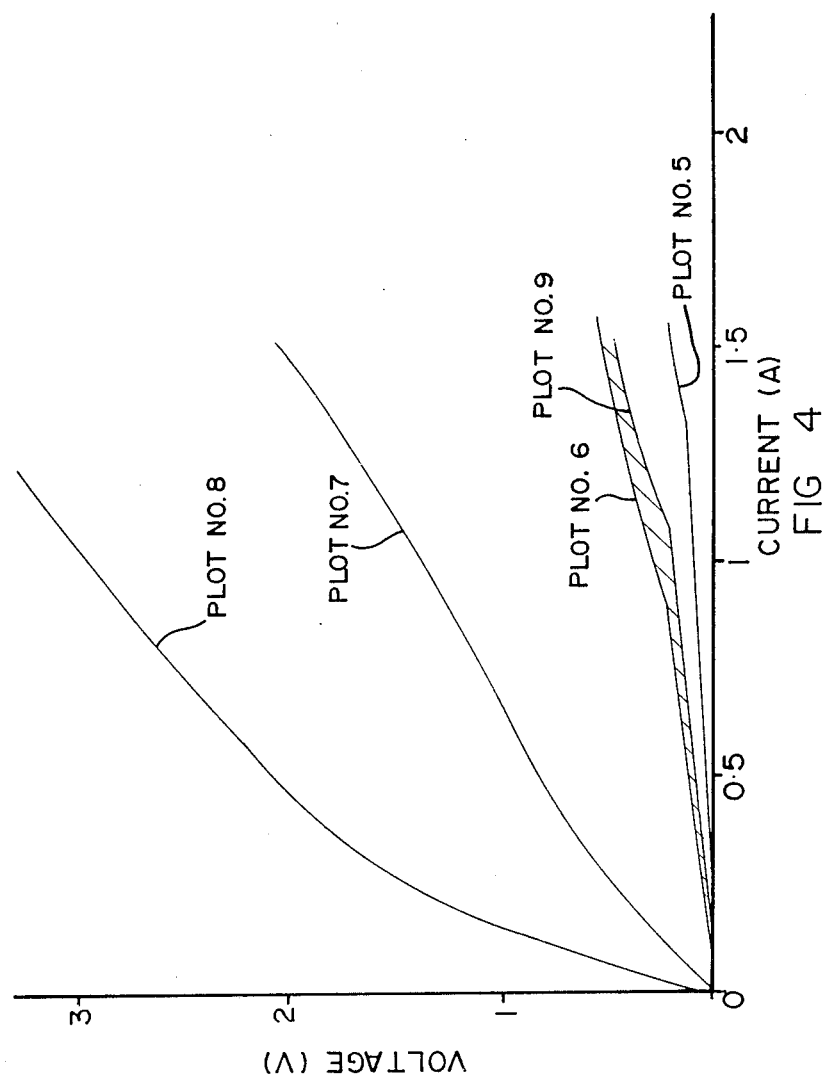

Results are set out in FIG. 4, in which Plot No 5 is for Formulation No. 7, tested immediately after heating to 300° C.; Plot No 6 is for Formulation No 8 immediately after heating to 300° C.; Plot No 7 is for Formulation No 8, 4 hours after heating to 300° C.; and Plot No 8 is for Formulation No 12, 20 hours after heating to 300° C. Formulations Nos 9, 10 and 11 were tested 20 hours after heating to 300° C. and these three tests provided plots between Plot No 5 and Plot No 9, i.e. in the shaded zone in FIG. 4.

Sodium Pyrophosphate (Na$_4$P$_2$O$_7$) Dopant

The tests described above for Sodium carbonate dopant were repeated for Na$_4$P$_2$O$_7$ dopant, for the electrolyte formulations set out in Table 3 hereunder.

TABLE 3

| Formulation No | Mole % of NaCl and AlCl$_3$ in Base Electrolyte | | Mass Concentration of Dopant Add (% m/m) |
|---|---|---|---|
| | NaCl (mole %) | AlCl$_3$ (mole %) | |
| 13 | 50 | 50 | 3 |
| 14 | 47 | 53 | 3 |
| 15 | 48 | 52 | 3 |
| 16 | 49 | 51 | 3 |
| 17 | 49 | 51 | Nil (Control) |

Figure 5:
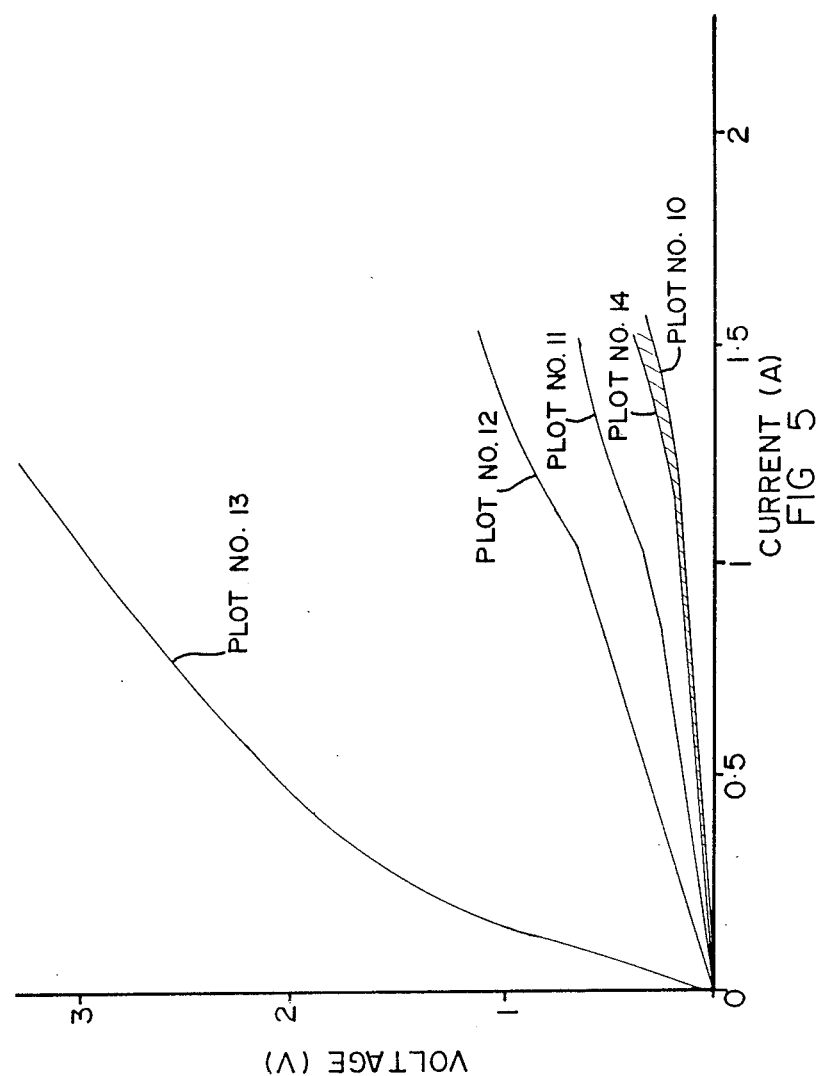

Results are set out in FIG. 5, in Which Plot No is for Formulation No 13 tested immediately after heating to 300° C.; Plot No 11 is for Formulation No 14 immediately after heating to 300° C.; Plot No 12 is for Formulation No 14 after 20 hours at 300° C.; and Plot No 13 is for Formulation No 17 after 20 hours at 300° C. Formulations Nos 15 and 16 were tested 20 hours after heating to 300° C. and these two tests provided plots between Plot No 10 and Plot No 14, i.e. in the shaded zone in FIG. 5.

Borax (Na$_2$B$_4$O$_{10}$) Dopant

The tests described above for sodium carbonate dopant were repeated for borax dopant, for the electrolyte formulations set out in Table 4 hereunder.

TABLE 4

| Formulation No | Mole % of NaCl and AlCl$_3$ in Base Electrolyte | | Mass Concentration of Dopant Add (% m/m) |
|---|---|---|---|
| | NaCl (mole %) | AlCl$_3$ (mole %) | |
| 18 | 50 | 50 | 3 |
| 19 | 48 | 52 | 3 |
| 20 | 49 | 51 | 3 |
| 21 | 49 | 51 | Nil (Control) |

Figure 6:
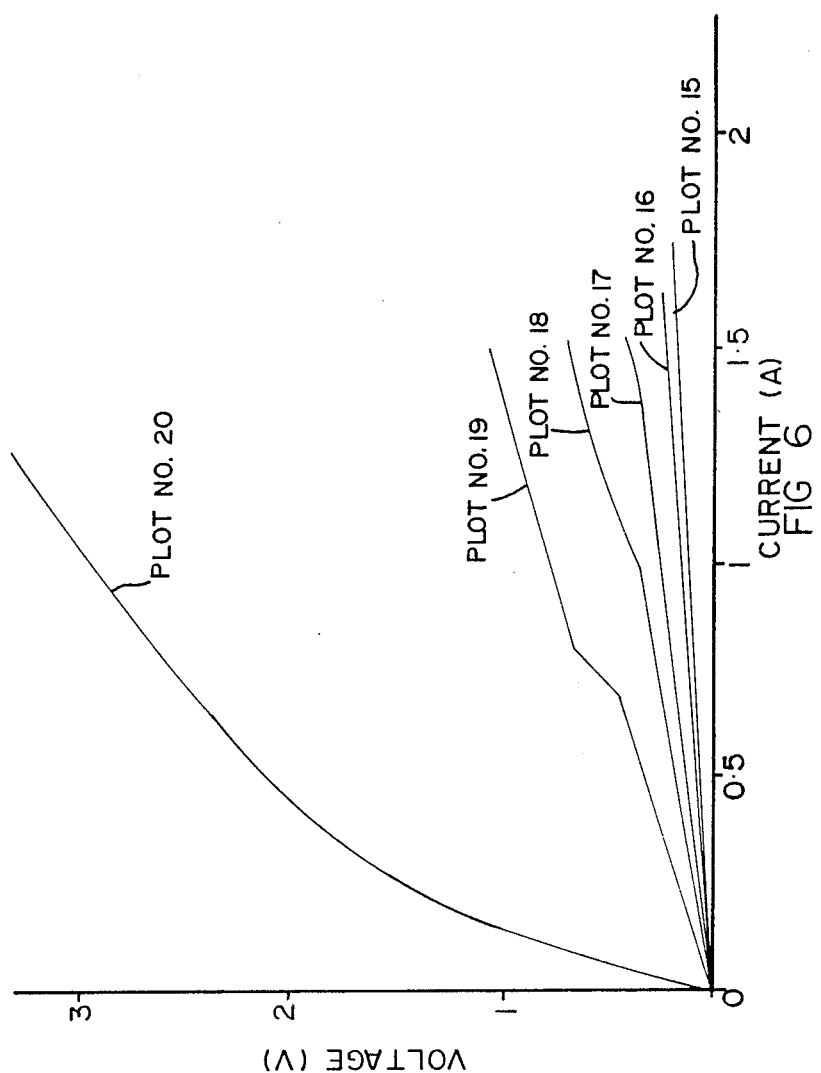

Results are set out in FIG. 6, in which Plot No 15 is for Formulation No 18 tested immediately after heating to 300° C.; Plot No 16 is for Formulation No 20 tested immediately after heating to 300° C.; Plot No 17 is for Formulation No 20 after 20 hours at 300° C.; Plot No 18 is for Formulation No 19 tested immediately after heating to 300° C.; Plot No 19 is for Formulation No 19 after 20 hours at 300° C.; and Plot No 20 is for Formulation No 21 after 20 hours at 300° C.

From FIGS. 3 to 6 it appears that the sodium carbonate dopant of FIG. 3 was the most effective. Plot No 2 shows a relatively low resistance increase for the 43:57 mole ratio of NaCL:AlCl$_3$ of Formulation No 2 after 20 hours; and Formulation No 3 after 20 hours gave only a slightly higher resistance than the control 50:50 mole ratio of Plot No 1.

Turning to the sodium oxalate of FIG. 4, it appears also that this is an effective dopant which makes the melt and/or $\beta''$-alumina tubes tolerant to acidic conditions in the melt, and it is only at the 43:57 mole ratio of NaCl:AlCl$_3$ for Formulation No 8 after 24 hours that resistance increase becomes marked (Plot No 7).

Using the sodium pyrophosphate dopant (FIG. 5), the AlCl$_3$ had to be increased to a NaCl:AlCl$_3$ ratio of 47:53 (Plot No 12) before any significant rise in resistance occurred. Each addition in AlCl$_3$ after the first took place 20 hours after the previous one, so that there was ample time for slow increases in resistance to manifest themselves.

Finally, from FIG. 6, while Formulation 20 showed little increase in resistance (Plots Nos 16 and 17), increases were noted for Formulation No 19) Plots Nos 18 and 19), particularly after 20 hours. Nevertheless, Formulation No 19 gave far better results than the undoped control of Plot No 20 for Formulation No 21.

Undoped Electrolytes - Controls

Various undoped electrolyte formulations were tested in similar fashion, the formulations tested being set out in Table 5 hereunder.

TABLE 5

| Formulation No. | Mole % of NaCl and AlCl$_3$ in Electrolyte | |
|---|---|---|
| | NaCl (Mole %) | AlCl$_3$ (Mole %) |
| 22 | 50 | 50 |
| 23 | 49 | 51 |
| 24 | 40 | 60 |

Results are set out in FIG. 7, in which Plot No 21 is for Formulation No 22 tested immediately after heating to 300° C.; Plot No 22 is for Formulation No 23 tested immediately after heating to 300° C.; Plot No 23 is for Formulation No 23 after 20 hours at 300° C.; Plot No 24 is for Formulation 24 tested immediately after heating to 300° C.; and Plot No 25 is for Formulation No 24 after 20 hours at 300° C.

In this case, even the 49:51 mole ratio melt of Formulation No 23 gave an immediate and- substantial resistance increase (Plot 22) and after 20 hours this had dramatically increased (Plot No 23) indicating that the $\beta''$-alumina/melt interfaces had probably undergone both poisoning and concentration polarization. In the case of the 40:60 melts of Formulation No 24 the immediate increase in resistance was so large that the voltage of the cell was difficult to determine, even for very small currents.

EXAMPLE 3 - OVERCHARGED CELL TESTS

A cell of the type shown in FIG. 1 was constructed, employing a porous nickel cathode matrix and NiCl$_2$ as active cathode material. Molten salt electrolyte of the type described in Example 1 was loaded into the cell, but having no excess NaCl, the mole ratio of NaCl:AlCl$_3$ in the electrolyte being 50:50 and the electrolyte containing 3% by mass sodium carbonate. The cell was a low-loaded cell in that its cathode was loaded to have only 0.1 Ah/g equivalent of NaCl in its fully discharged state.

The cell was discharged at 300° C. and then taken through a number of charge/discharge cycles, a number of which involved deliberately overcharging the cell. The cell was constructed and loaded so that, in its fully charged state, the mole ratio of NaCl:AlCl$_3$ was said 50:50 mole ratio. The cell was such that when it was overcharged by 1 Ah capacity said mole ratio was 47,7:52,3; when it was overcharged by 2 Ah capacity said mole ratio was 45:55; and when it was overcharged by 3 Ah said mole ratio was 42,2:57,8. During discharge of the cell from an overcharged state said ratio increased to 50:50 at the fully charged state and during subsequent discharge said 50:50 ratio remained constant substantially at 50:50, NaCl discharge reaction product being insoluble in the electrolyte and being produced in solid form.

Figure 8:
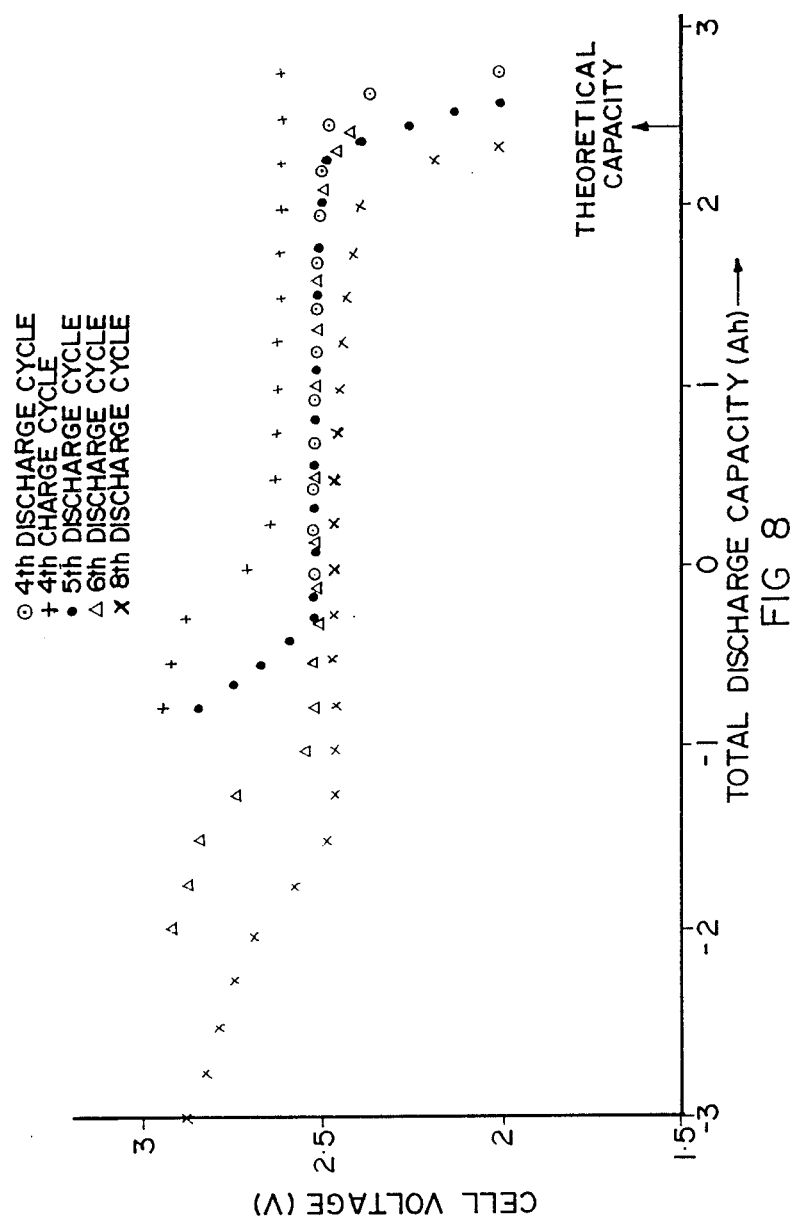
FIGS. 8-11 show plots of charge/discharge curves of cell voltage (V) against capacity (Ah) for cells according to the invention of the type shown in FIG. 1.

The cell was charged at a charging current of 0,5 A (equivalent to 10 mA/cm$^2$) and was discharged at a current of 1,0 A (20 mA/cm$^2$). In FIG. 8 selected charge and discharge cycles are plotted in terms of voltage against total discharge capacity, i.e. the state of charge of the cell, the theoretical capacity of the cell being indicated. The resistivity which was 2,889 ohm cm$^2$, was normal after overdischarging, within the usual range of 2,5–3,0 ohm cm$^2$ for cells of the type in question which have not been overcharged.

EXAMPLES 4–6 - OVERCHARGED CELL TESTS

Example 3 was repeated but using 3% by mass Na$_4$P$_2$O$_7$ dopant, (Example 4); sodium oxalate dopant (Example 5); and borax dopant (Example 6). Results are plotted in similar fashion respectively on FIG. 9 (Na$_4$P$_2$O$_7$); FIG. 10 (sodium oxalate); and FIG. 11 (borax).

FIGS. 8–11 confirm the tolerance of the doped melts to overcharging in the cells in question. Previous results obtained by the Applicant for similar cells with undoped electrolytes had shown considerable increases in internal resistance on overcharging, consistent with the results of Example 2 and shown in FIGS. 3–7.

The best results in Examples 3–6 were obtained for the sodium carbonate dopant of Example 3. When this cell was overcharged by 2 Ah (80% overcharge) no increase in cell resistance occurred, such a rise only occurring after 3 Ah (120% overcharge) the dopant having the least effect was borax (Example 6). while sodium oxalate appeared to be a better dopant than sodium pyrophosphate.

In cells of the type in question and to which the doping of the present invention is applicable, the presence of an acidic melt in the cathode compartment a considerable disadvantage. In the past, the Applicant has guarded against the occurrence of an acidic molten salt electrolyte (i.e. a NaCl:AlCl$_3$ mole ratio in the melt which is less than 1:1) by ensuring that during operation at all states of charge, in particular in the fully charged state, there is solid NaCl in contact with the molten salt electrolyte.

In practice, this means that the capacity of the cell has in the past been predetermined by the amount of Ni (or other transition metal active cathode material, if used) present in the discharged cathode and which is desired to be used upon charging. It follows that the fully discharged cell must contain sufficient alkali metal chloride such as NaCl in the cathode compartment in contact with the molten salt electrolyte, both to permit chlorination of the available active cathode transition metal, and to provide said excess NaCl which guards against acidity in the molten salt electrolyte upon overcharging.

This excess NaCl or like alkali metal chloride has problems of its own associated therewith. Apart from constituting electrochemically dead weight, this NaCl is available upon overcharging to chlorinate any nickel or other transition metal in the cathode compartment in excess of that desired to function in the cell as active cathode material. Frequently cells of the type in question have a transition metal current collector of backbone in the form of an electrolyte-permeable porous matrix which is saturated by the molten salt electrolyte. If this matrix metal is chlorinated upon overcharging, it can be difficult to re-establish the metal matrix upon subsequent discharging of the cell, leading to increased internal resistance in the cell and a permanent partial loss of capacity. Also, once any excess NaCl is consumed and the electrolyte becomes acidic, active cathode materials such as FeCl$_2$ and NiCl$_2$ can dissolve therein, leading to erosion or dissolution of the cathode on loss of capacity.

The present invention in contrast, employs the dopant used as a buffer, to buffer the Lewis-acidity of the molten salt electrolyte when the mole ratio of NaCl:AlCl$_3$ drops below 1:1. Said excess NaCl in the molten salt electrolyte of the fully charged cell is no longer required, eliminating the problem of dead weight and retarding the chlorination of nickel or other transition metal matrix or backbone material required for current collection.

A further significant advantage of the present invention is that it permits higher charging rates than prior art cells of the type in question having no dopant. Even when such prior cells are guarded against said electrolyte poisoning by overcharging by excess solid NaCl, electrolyte acidity and poisoning of $\beta'''$-alumina or the like solid electrolyte, and dissolution and erosion of the cathode can still take place. Thus, at high charging rates, zones of the cathode can become locally starved of NaCl, and solid NaCl in contact with the starved electrolyte cannot dissolve quickly enough and/or diffuse quickly enough into these starved zones to maintain Lewis-acid neutrality there, these acid zones in the cathode can thus lead to the abovedescribed poisoning of $\beta''$- or $\beta$-alumina by Na$_2$O depletion thereof caused by AlCl$_3$ in the melt, and said erosion and dissolution of the cathode. By providing a Lewis-acidity buffer dissolved in the melt, and the dopants of the present invention eliminate or at least reduce this problem.

In use cells of the type in question can become overcharged for various reasons, particularly if connected in series and/or parallel in batteries. The present invention, whatever the mechanism or function of the dopant, has been found to reduce the progressive rise in internal resistance associated with overcharging and the attendant acidity of the molten salt electrolyte.

Thus FIGS. 3 to 7 clearly demonstrate that an increase in internal resistance occurs at the solid electrolyte/molten salt electrolyte interface when the molten salt electrolyte is acidic. The more acidic the greater the rise in resistance; and the longer the period of exposure of the solid electrolyte to the high temperature acid melt, the greater the rise in resistance. Use of the dopants according to the invention can dramatically reduce the rate of increase of internal resistance, to a value marginally above that encountered with a 50:50 molar neutral molten salt electrolyte.

FIG. 8 in particular demonstrates that the 5th and 6th discharge cycles, which respectively occurred after approximately 1 Ah and 2 Ah overcharge, took place at the substantially same voltage as the 4th discharge cycle which took place after no overcharging. Only after considerable overcharging [3 Ah greater than the normal cell capacity] did the 8th discharge cycle demonstrate a drop in cell voltage indicative of an increase in cell internal resistance.

Figure 9:
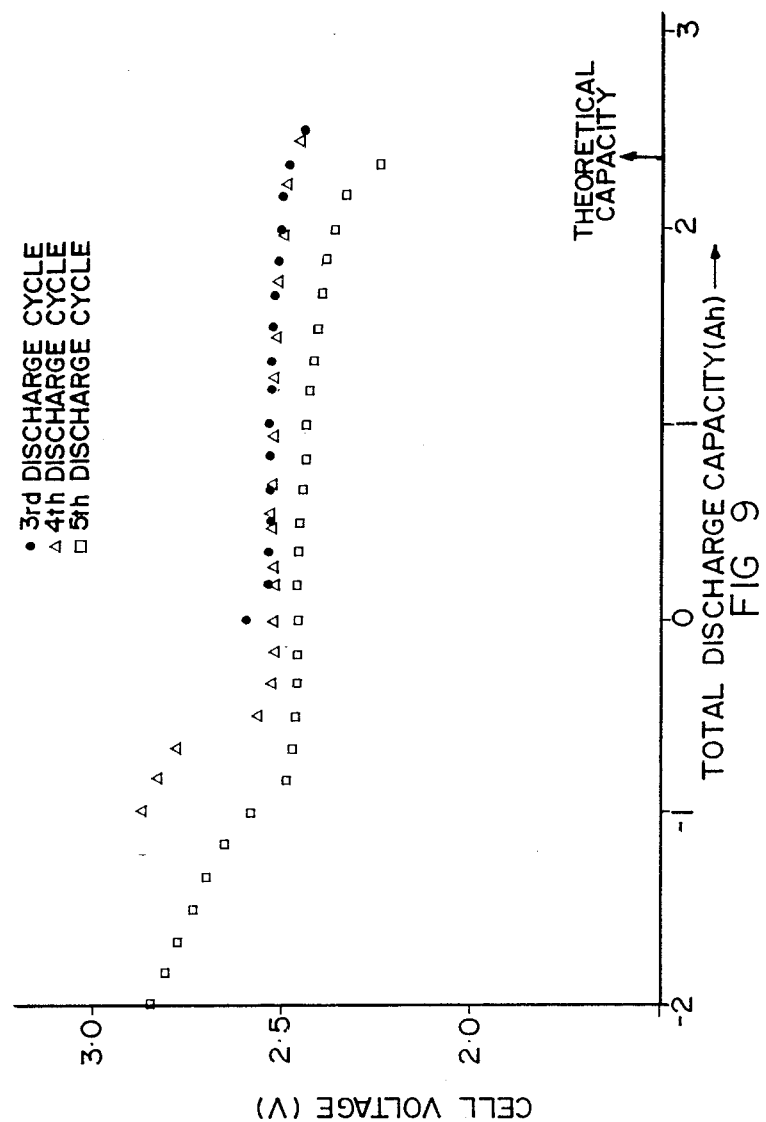
Figure 10:
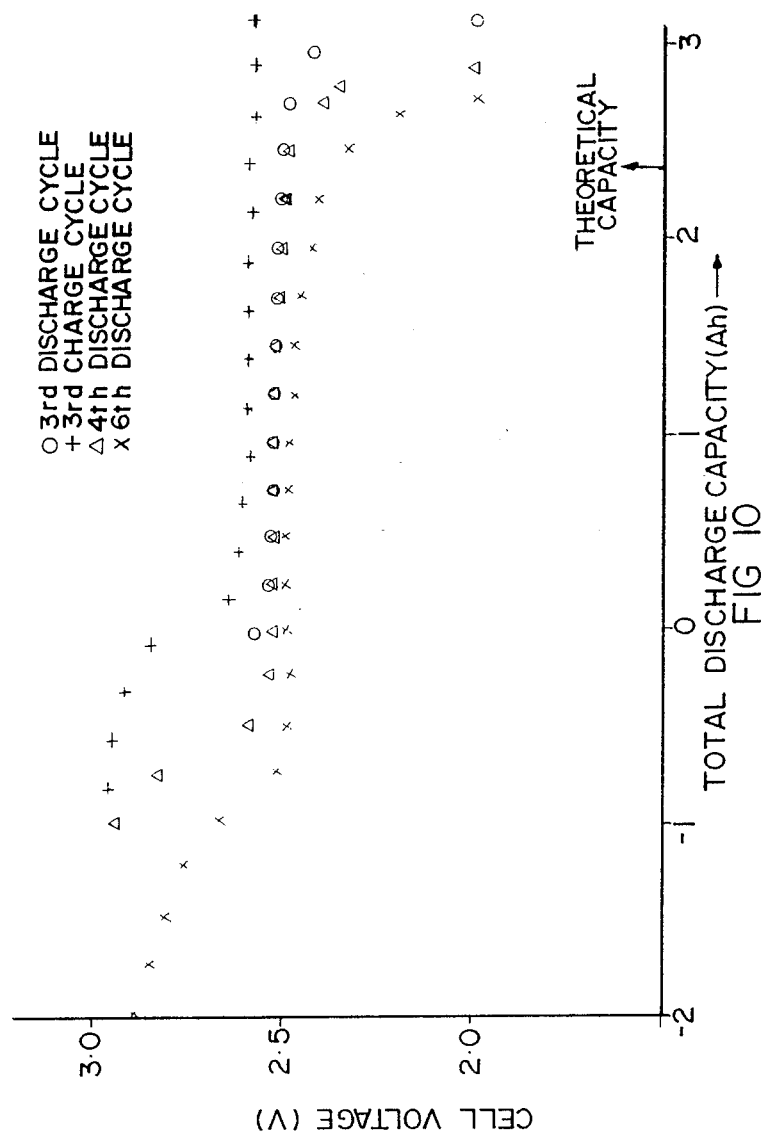
Figure 11:
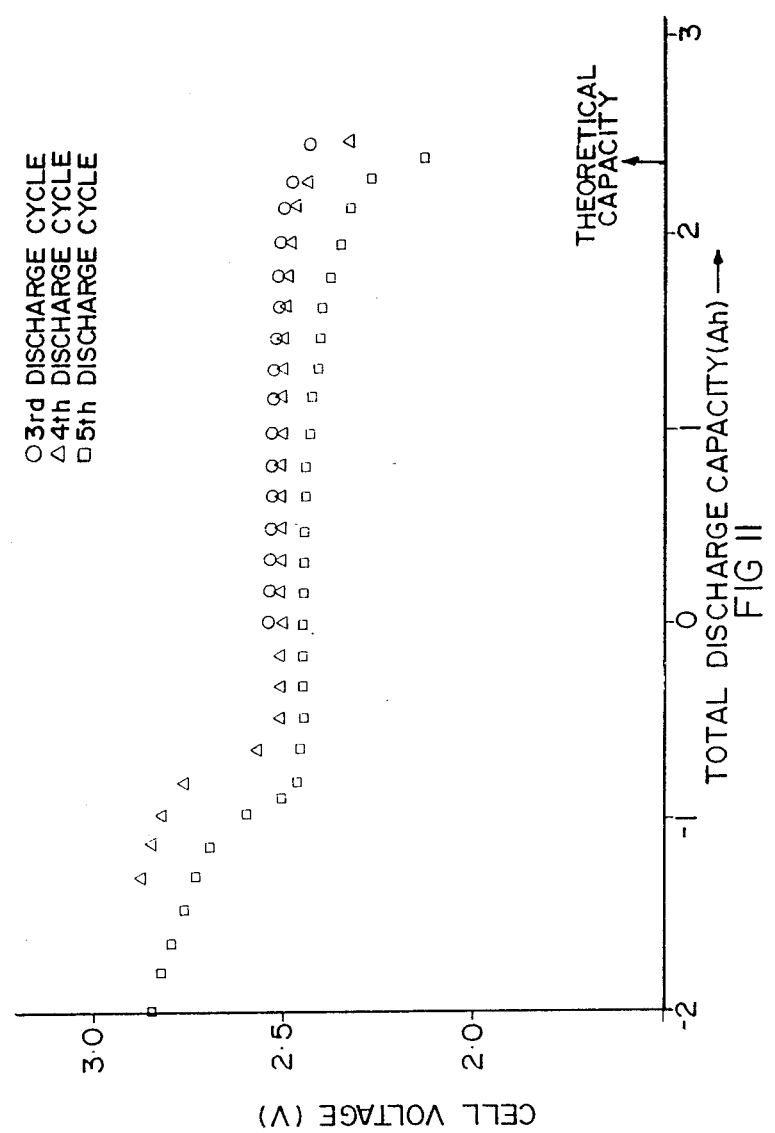

Similarly in FIG. 9, the 4th discharge cycle demonstrates no drop in voltage or increase in internal resistance after 1 Ah overcharge, compared with the 3rd discharge cycle which took place after no overcharging. Only after a 2 Ah overcharge did the 5th discharge cycle show a drop in voltage and increase in internal resistance. Similarly in FIG. 10, a 2 Ah overcharge was required to show a voltage drop and resistance increase during the sixth discharge cycles; but FIG. 11 shows a voltage drop after only 1 Ahr overcharge.

It is an advantage of the present invention that it provides a cell, an electrolyte and a method of cell operation which combat progressive rises in internal resistance upon charge/discharge cycling believed to arise from progressive poisoning of the separator by $Na_2O$ depletion thereof, caused by an acid molten salt electrolyte. It is also expected to control any cathode dissolution or erosion arising from an acid electrolyte.

Cells of the present type, i.e. those having the transition metals in question and which are halogenated upon charging, have an advantage compared with sodium/sulphur cells, in that they can pass a current on overcharge, whereas sodium/sulphur cells cannot. The present invention allows cells with these transition metal cathodes to make better use of this facility of passing current upon deliberate overcharge, while they can better tolerate accidental overcharge, with reduced adverse effects of such overcharge arising from electrolyte acidity.

I claim:

1. A high temperature rechargeable electrochemical power storage cell which comprises:
   an alkali metal anode which is molten at the operating temperature of the cell;
   an alkali metal aluminum halide molten salt electrolyte whose alkali metal is the same as that of the anode, and whose halide ions include chloride ions and which is molten at the operating temperature of the cell;
   a cathode whose active cathode material comprises at least one member of the group of transition metals consisting of Fe, Ni, Co, Cr and Mn and which is in contact with said electrolyte; and
   between the anode and electrolyte separating them from each other, a separator which is a solid conductor of ions of the alkali metal of the anode, and electrolyte containing 2–30 mole % of a dopant which is a buffer and is a member of the group of compounds consisting of $M_2X$, MY and $M_AZ$ in which M is the alkali metal of the anode, X is a divalent anion, Y is a monovalent anion other than a halide and Z is a polyvalent anion with a valency of A which is at least 3, said buffer acting to buffer and reduce the Lewis acidity of the electrolyte.

2. A cell as claimed in claim 1, in which the alkali metal of the anode and of the molten salt electrolyte is Na, the separator being β-alumina.

3. A cell as claimed in claim 1, in which the dopant comprises at least one member of the group consisting of
   $M_2O$;
   $M_2CO_3$;
   $M_2SO_4$;
   $M_2PO_4$;
   $M_2BO_4$;
   $M_2SO_3$;
   $MAlO_2$; and
   $MPO_3$.

4. A cell as claimed in claim 1, in which the dopant is present in the molten salt electrolyte in a proportion of 5–10 mole %.

5. A cell as claimed in claim 1, in which the active cathode material is dispersed in an electrolyte-permeable, electronically conductive matrix, which has the molten salt electrolyte impregnated therein.

6. A molten salt electrolyte for a high temperature rechargeable electrochemical power storage cell, the electrolyte comprising an alkali metal aluminum halide, whose ions include chloride ions, the electrolyte containing 2–30 mole % of a dopant which is a buffer and is a member of the group consisting of $M_2X$ and MY in which M is an alkali metal, X is a divalent anion and Y is a monovalent anion other than a halide, said dopant reacting with $MAlCL_4$ in accordance with any one of reactions (I)–(III) as follows:

$$M_2X + MAlCL_4 \rightarrow 2MCl + MAlCl_2X; \quad (I)$$

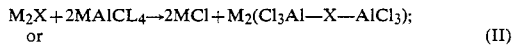
$$M_2X + 2MAlCL_4 \rightarrow 2MCl + M_2(Cl_3Al-X-AlCl_3);$$
$$\text{or} \quad (II)$$

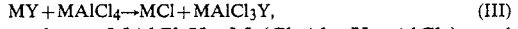
$$MY + MAlCl_4 \rightarrow MCl + MAlCl_3Y, \quad (III)$$

the products $MAlCl_2X$, $M_2(Cl_3Al-X-AlCl_3)$ and $MAlCl_3Y$ having a lower Lewis acidity than $MAlCl_4$, and the doped molten salt electrolyte containing M and Al in a M:Al molar ratio of at least 1:1.

7. An electrolyte as claimed in claim 6, in which M is Na and the proportion of dopant is 5–10 mole %.

8. An electrolyte as claimed in claim 6, in which the dopant comprises at least one member of the group consisting of
   $M_2O$;
   $M_2CO_3$;
   $M_2SO_4$;
   $M_2PO_4$;
   $M_2BO_4$;
   $M_2SO_3$;
   $MAlO_2$; and
   $MPO_3$.

9. A method of combatting progressive rise in internal resistance of a high temperature rechargeable electrochemical power storage cell comprising an alkali metal anode which is molten at the operating temperature of the cell, an alkali metal aluminum halide molten salt electrolyte whose alkali metal is the same as that of the anode and whose halide ions include chloride ions, the electrolyte being molten at the operating temperature of the cell, a cathode whose active cathode material comprises at least one member of the group of transition metals consisting of Fe, Ni, Co, Cr, and Mn and which is in contact with said electrolyte, and a separator which is a solid conductor of ions of the alkali metal of the anode between the anode and the electrolyte and separating them from each other, the method comprising doping the electrolyte with a dopant which is a buffer and is a member of the group consisting of $M_2X$ and MY in which M is the alkali metal of the anode, X is a divalent anion and Y is a monovalent anion other than a halide, said dopant reacting with $MAlCl_4$ in accordance with any one of reactions (I)–(III) as follows:

$$M_2X + MAlCL_4 \rightarrow 2MCl + MAlCl_2X; \quad (I)$$

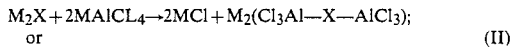
$$M_2X + 2MAlCL_4 \rightarrow 2MCl + M_2(Cl_3Al-X-AlCl_3);$$
$$\text{or} \quad (II)$$

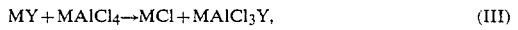
$$MY + MAlCl_4 \rightarrow MCl + MAlCl_3Y, \quad (III)$$

the products $MAlCl_2X$, $M_2(Cl_3Al-X-AlCl_3)$ and $MAlCl_3Y$ having a lower Lewis acidity than $MAlCl_4$, so that the doped molten salt electrolyte contains M and Al in a M:Al molar ratio of least 1:1 and so that the dopant is present in the molten salt electrolyte in a proportion of 2–30 mole %.

10. A method as claimed in claim 9, in which the dopant comprises at lease one member of the group consisting of $M_2O$;
$M_2CO_3$;
$M_2SO_4$;
$M_2PO_4$;
$M_2BO_4$;
$M_2SO_3$;
$MAlO_2$; and
$MPO_3$.

* * * * *

UNITED STATES PATENT AND TRADEMARK OFFICE
CERTIFICATE OF CORRECTION

PATENT NO. : 4,975,343

DATED : December 4, 1990

INVENTOR(S) : Johan Coetzer

It is certified that error appears in the above-identified patent and that said Letters Patent is hereby corrected as shown below:

| CLAIM | COLUMN | LINE | CHANGES/CORRECTIONS |
|---|---|---|---|
| 1 | 13 | 38 | Insert --and-- between "electrolyte" and "separating". |
| 1 | 13 | 40 | Change "and" to --the--. |
| 6 | 14 | 11, 14, 16 | Change each occurrence of "MAlCL$_4$" to --MAlCl$_4$--. |
| 9 | 14 | 58 | Change "MAlCL$_4$" to -- MAlCl$_4$ --. |
| 9 | 14 | 60 | Change "MAlCL$_4$" to -- MAlCl$_4$--. |

Signed and Sealed this

Seventh Day of July, 1992

Attest:

DOUGLAS B. COMER

*Attesting Officer*  *Acting Commissioner of Patents and Trademarks*